(12) United States Patent
Pitchumani et al.

(10) Patent No.: US 11,275,762 B2
(45) Date of Patent: Mar. 15, 2022

(54) SYSTEM AND METHOD FOR HYBRID DATA RELIABILITY FOR OBJECT STORAGE DEVICES

(71) Applicant: Samsung Electronics Co., Ltd., Suwon-si (KR)

(72) Inventors: Rekha Pitchumani, Fairfax, VA (US); Yang Seok Ki, Palo Alto, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 91 days.

(21) Appl. No.: 16/165,655

(22) Filed: Oct. 19, 2018

(65) Prior Publication Data
US 2019/0057140 A1 Feb. 21, 2019

Related U.S. Application Data

(63) Continuation-in-part of application No. 15/967,302, filed on Apr. 30, 2018, now Pat. No. 10,552,062, and
(Continued)

(51) Int. Cl.
*G06F 17/30* (2006.01)
*G06F 3/06* (2006.01)
(Continued)

(52) U.S. Cl.
CPC .............. *G06F 16/27* (2019.01); *G06F 3/064* (2013.01); *G06F 3/0614* (2013.01);
(Continued)

(58) Field of Classification Search
CPC ...... G06F 3/0683; G06F 3/064; G06F 3/0638; G06F 3/0614; G06F 3/0671;
(Continued)

(56) References Cited

U.S. PATENT DOCUMENTS 7,487,289 B2 2/2009 Ito et al.
8,458,233 B2 6/2013 Gladwin et al.
(Continued)

FOREIGN PATENT DOCUMENTS

JP 2015-519674 A 7/2015
JP 2015-520588 A 7/2015
(Continued)

OTHER PUBLICATIONS

Wu, Chin-Hsien et al.; An Efficient B-Tree Layer for Flash-Memory Storage Systems, Department of Computer Science and Information Engineering, National Taiwan University, Taipei, Taiwan, 2003, 20 pages.
(Continued)

*Primary Examiner* — Ramon A. Mercado
(74) *Attorney, Agent, or Firm* — Lewis Roca Rothgerber Christie LLP

(57) ABSTRACT

Provided is a method of storing data in a key-value reliability system including N storage devices that are grouped into a reliability group as a single logical unit and that are managed by a virtual device management layer, N being an integer, the method including determining whether the data meets a threshold corresponding to a reliability mechanism for storing the data, selecting the reliability mechanism when the threshold is met, and storing the data according to the selected reliability mechanism.

17 Claims, 6 Drawing Sheets

Related U.S. Application Data a continuation-in-part of application No. 15/876,028, filed on Jan. 19, 2018, now Pat. No. 10,795,760.

(60) Provisional application No. 62/713,479, filed on Aug. 1, 2018, provisional application No. 62/635,311, filed on Feb. 26, 2018, provisional application No. 62/562,219, filed on Sep. 22, 2017, provisional application No. 62/561,625, filed on Sep. 21, 2017, provisional application No. 62/474,039, filed on Mar. 20, 2017.

(51) Int. Cl.
*G06F 16/27* (2019.01)
*G06F 11/14* (2006.01)

(52) U.S. Cl.
CPC .......... *G06F 3/0638* (2013.01); *G06F 3/0671* (2013.01); *G06F 3/0683* (2013.01); *G06F 11/14* (2013.01)

(58) Field of Classification Search
CPC ............. G06F 11/1004; G06F 11/0176; G06F 11/2094; G06F 16/27
See application file for complete search history.

(56) References Cited

U.S. PATENT DOCUMENTS

| | | | |
|---|---|---|---|
| 8,504,535 B1 | 8/2013 | He et al. | |
| 8,856,593 B2 | 10/2014 | Eckhardt et al. | |
| 8,904,047 B1* | 12/2014 | Kornfeld | G06F 3/0611 710/7 |
| 8,949,180 B1* | 2/2015 | Natanzon | G06F 16/28 707/610 |
| 9,047,211 B2 | 6/2015 | Wood et al. | |
| 9,378,088 B1* | 6/2016 | Piszczek | G06F 16/182 |
| 9,417,963 B2 | 8/2016 | He et al. | |
| 9,569,517 B1* | 2/2017 | Smola | G06F 11/14 |
| 9,594,633 B2 | 3/2017 | Colgrove et al. | |
| 9,639,268 B2 | 5/2017 | Patterson, III | |
| 2002/0165942 A1* | 11/2002 | Ulrich | G06F 9/5083 709/219 |
| 2008/0010580 A1* | 1/2008 | Anderson | G11B 20/1833 714/763 |
| 2014/0136782 A1 | 5/2014 | Thomas | |
| 2015/0019937 A1 | 1/2015 | Baker et al. | |
| 2015/0149870 A1* | 5/2015 | Kozat | H04L 1/0048 714/772 |
| 2015/0302111 A1 | 10/2015 | Yue et al. | |
| 2015/0363269 A1 | 12/2015 | Baker et al. | |
| 2016/0099810 A1* | 4/2016 | Li | H04L 9/0894 713/193 |
| 2017/0177266 A1* | 6/2017 | Doerner | G06F 3/0641 |
| 2017/0206135 A1 | 7/2017 | Zeng | |
| 2017/0272209 A1 | 9/2017 | Yanovsky et al. | |
| 2017/0308437 A1 | 10/2017 | Usvyatsky et al. | |
| 2017/0351575 A1 | 12/2017 | Baker et al. | |
| 2018/0262567 A1* | 9/2018 | Klein | G06F 3/0631 |
| 2018/0314429 A1 | 11/2018 | Thomas | |
| 2019/0057140 A1* | 2/2019 | Pitchumani | G06F 11/2094 |

FOREIGN PATENT DOCUMENTS

| | | |
|---|---|---|
| JP | 2016-500183 A | 1/2016 |
| WO | 2016/137402 A1 | 9/2016 |

OTHER PUBLICATIONS

Office action issued in related U.S. Appl. No. 15/876,028 by the USPTO, dated Jun. 3, 2019, 33 pages.

* cited by examiner

SYSTEM AND METHOD FOR HYBRID DATA RELIABILITY FOR OBJECT STORAGE DEVICES

CROSS-REFERENCE TO RELATED APPLICATION(S)

This patent application claims priority to, and the benefit of, U.S. Provisional Patent Application No. 62/713,479 filed Aug. 1, 2018 and titled A SYSTEM, AND METHOD FOR HYBRID DATA RELIABILITY FOR OBJECT STORAGE DEVICES, and is a continuation in part of U.S. patent application Ser. No. 15/876,028 filed Jan. 19, 2018 and titled KEY VALUE SSD, which claims priority to, and the benefit of, U.S. Provisional Patent Application No. 62/474,039 filed Mar. 20, 2017 and titled KEY VALUE SSD, U.S. Provisional Patent Application No. 62/562,219 filed Sep. 22, 2017 and titled HYBRID STATELESS DATA PROTECTION METHOD AND SYSTEM FOR KEY VALUE STORAGES, and U.S. Provisional Patent Application No. 62/561,625 filed Sep. 21, 2017 and titled HYBRID STATELESS DATA PROTECTION METHOD AND SYSTEM FOR KEY VALUE STORAGES, and is also a continuation in part of U.S. patent application Ser. No. 15/967,302 filed Apr. 30, 2018 and titled SYSTEM AND METHOD FOR STORING VERY LARGE KEY VALUE OBJECTS, which claims priority to, and the benefit of, U.S. Provisional Patent Application No. 62/635,311 filed Feb. 26, 2018 and titled A DEVICE AND METHOD FOR STORING VERY LARGE KEY VALUE OBJECTS, the entire contents of all of which is incorporated herein by reference.

FIELD

One or more aspects of embodiments of the present disclosure relate generally to data storage systems, and relate more particularly to a method for choosing a reliability mechanism for reliably storing key-value data in a key-value reliability system including a plurality of key-value storage devices.

BACKGROUND

Data reliability mechanisms, such as erasure coding, may be employed to overcome data loss due to data corruptions and storage device failures in many installations having multiple storage devices.

Traditional solid state drives (SSDs) typically use only a block interface, and may provide data reliability through a redundant array of independent disks (i.e., RAID methodology), through ensure coding, or replication. As object formats become variable in size and unstructured, there is a desire for effective data conversion between object and block level interfaces. Further, it is desirable to ensure data reliability while maintaining space efficiency and fast access time characteristics.

Techniques, such as RAID, have been well studied for traditional block storage devices. However, relatively new key-value storage devices may have different interfaces and different storage semantics than traditional block devices. Accordingly, many new key-value storage devices may potentially benefit from new data reliability mechanisms tailored to, or adopted for, key-value data and key-value storage devices.

SUMMARY

Embodiments described herein provide improvements to the field of memory storage, as the reliability mechanisms of the embodiments are each capable of a single key repair procedure that enables a virtual device management layer to repair and copy all of the keys present in the failed memory device to a new memory device.

According to one embodiment of the present disclosure, there is provided a method of storing data in a key-value reliability system including N storage devices that are grouped into a reliability group as a single logical unit and that are managed by a virtual device management layer, N being an integer, the method including determining whether the data meets a threshold corresponding to a reliability mechanism for storing the data, selecting the reliability mechanism when the threshold is met, and storing the data according to the selected reliability mechanism.

The threshold may be based on one or more of object size of the data, throughput consideration of the data, read/write temperature of the data, and underlying erasure coding capabilities of the N storage devices.

The method may further include using one or more bloom filters or caches for testing the data for the reliability mechanism.

The method may further include inserting metadata with a key corresponding to the data for recording the selected reliability mechanism, one or more checksums for each of the N storage devices storing the data, object sizes of the values of the data stored in each of the N storage devices storing the data, and a location of parity group members of the N storage devices for indicating which of the N storage devices are storing the data.

The selected reliability mechanism may include object replication, and wherein storing the data includes selecting a KV value, calculating a hash for hashing a key corresponding to the selected KV value, determining a subset of storage devices of the N storage devices for storing replicas of key objects corresponding to the KV value, and writing updated values corresponding to the KV value to each of the determined subset of storage devices under a same user keyname.

The selected reliability mechanism may include packing, and wherein storing the data includes selecting k key objects stored in k storage devices of the N storage devices of the reliability group, k being an integer, retrieving k value objects corresponding to the k key objects, padding virtual zeroes on ends of ones of the k value objects that do not have a largest value size of the k value objects to make a virtual value size of all of the k value objects the same, creating r parity objects from the k key objects, r being an integer, writing the k key objects to the k storage devices, and writing the r parity objects to r storage devices of the N storage devices, each of the r storage devices being distinct from the k storage devices, wherein k+r=N.

The selected reliability mechanism may include packing using traditional erasure coding, and wherein the N storage devices are configured with traditional (k,r) maximum distance separable (MDS) erasure coding.

The selected reliability mechanism may include packing using regeneration erasure coding, and wherein the N storage devices are configured with (k,r,d) regeneration erasure coding.

The selected reliability mechanism may include splitting, and wherein storing the data includes selecting a KV value, splitting the KV value into k equally sized objects, k being an integer, creating r parity objects from the k equally sized objects, r being an integer, calculating a hash for hashing a key corresponding to the selected KV value, determining a primary device of the N storage devices in which to place the KV value based on the hash, and writing the k objects and r parity objects in the N storage devices in consecutive order and starting with the primary device, each of the r storage devices being distinct from the k storage devices, wherein k+r=N.

The selected reliability mechanism may include splitting using traditional erasure coding, and wherein the N storage devices are configured with a traditional (k,r) maximum distance separable (MDS) erasure coding.

The selected reliability mechanism may include splitting using regeneration erasure coding, wherein the N storage devices are configured with (k,r,d) regeneration erasure coding, and wherein storing the data further includes using the regeneration erasure coding to split each of the k equally sized objects into m subpackets, m being an integer, and splitting each of the r parity objects into m parity subpackets.

According to another embodiment of the present disclosure, there is provided a data reliability system for storing data based on a selected reliability mechanism, the data reliability system including N storage devices configured as a virtual device using stateless data protection, N being an integer, and a virtual device management layer configured to manage the storage devices as the virtual device to store data in selected ones of the N storage devices according to a selected reliability mechanism, the virtual device management layer being configured to determine whether the data meets a threshold corresponding to a reliability mechanism for storing the data, select the reliability mechanism when the threshold is met, and store the data according to the selected reliability mechanism.

The selected reliability mechanism may include object replication, and wherein the virtual device management layer is configured to store the data by selecting a KV value, calculating a hash for hashing a key corresponding to the selected KV value, determining a subset of storage devices of the N storage devices for storing replicas of key objects corresponding to the KV value, and writing updated values corresponding to the KV value to each of the determined subset of storage devices under a same user keyname.

The selected reliability mechanism may include packing, and wherein the virtual device management layer is configured to store the data by selecting k key objects stored in k storage devices of the N storage devices of the reliability group, k being an integer, retrieving k value objects corresponding to the k key objects, padding virtual zeroes on ends of ones of the k value objects that do not have a largest value size of the k value objects to make a virtual value size of all of the k value objects the same, creating r parity objects from the k key objects, r being an integer, writing the k key objects to the k storage devices, and writing the r parity objects to r storage devices of the N storage devices, each of the r storage devices being distinct from the k storage devices, wherein k+r=N.

The selected reliability mechanism may include splitting, and wherein the virtual device management layer is configured to store the data by selecting a KV value, splitting the KV value into k equally sized objects, k being an integer, creating r parity objects from the k equally sized objects, r being an integer, calculating a hash for hashing a key corresponding to the selected KV value, determining a primary device of the N storage devices in which to place the KV value based on the hash, and writing the k objects and r parity objects in the N storage devices in consecutive order and starting with the primary device, each of the r storage devices being distinct from the k storage devices, wherein k+r=N.

The selected reliability mechanism may include splitting using regeneration erasure coding, wherein the N storage devices are configured with (k,r,d) regeneration erasure coding, and wherein the virtual device management layer is further configured to store the data by using the regeneration erasure coding to split each of the k equally sized objects into m subpackets, m being an integer, and splitting each of the r parity objects into m parity subpackets.

According to yet another embodiment of the present disclosure, there is provided a non-transitory computer readable medium having computer code that, when executed on a processor, implements a method of storing data in a key-value reliability system including N storage devices that are grouped into a reliability group as a single logical unit and that are managed by a virtual device management layer, N being an integer, the method including determining whether the data meets a threshold corresponding to a reliability mechanism for storing the data, selecting the reliability mechanism when the threshold is met, and storing the data according to the selected reliability mechanism.

The selected reliability mechanism may include object replication, and wherein storing the data includes selecting a KV value, calculating a hash for hashing a key corresponding to the selected KV value, determining a subset of storage devices of the N storage devices for storing replicas of key objects corresponding to the KV value, and writing updated values corresponding to the KV value to each of the determined subset of storage devices under a same user keyname.

The selected reliability mechanism may include packing, and wherein storing the data includes selecting k key objects stored in k storage devices of the N storage devices of the reliability group, k being an integer, retrieving k value objects corresponding to the k key objects, padding virtual zeroes on ends of ones of the k value objects that do not have a largest value size of the k value objects to make a virtual value size of all of the k value objects the same, creating r parity objects from the k key objects, r being an integer, writing the k key objects to the k storage devices, and writing the r parity objects to r storage devices of the N storage devices, each of the r storage devices being distinct from the k storage devices, wherein k+r=N.

The selected reliability mechanism may include splitting, and wherein storing the data includes selecting a KV value, splitting the KV value into k equally sized objects, k being an integer, creating r parity objects from the k equally sized objects, r being an integer, calculating a hash for hashing a key corresponding to the selected KV value, determining a primary device of the N storage devices in which to place the KV value based on the hash, and writing the k objects and r parity objects in the N storage devices in consecutive order and starting with the primary device, each of the r storage devices being distinct from the k storage devices, wherein k+r=N.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
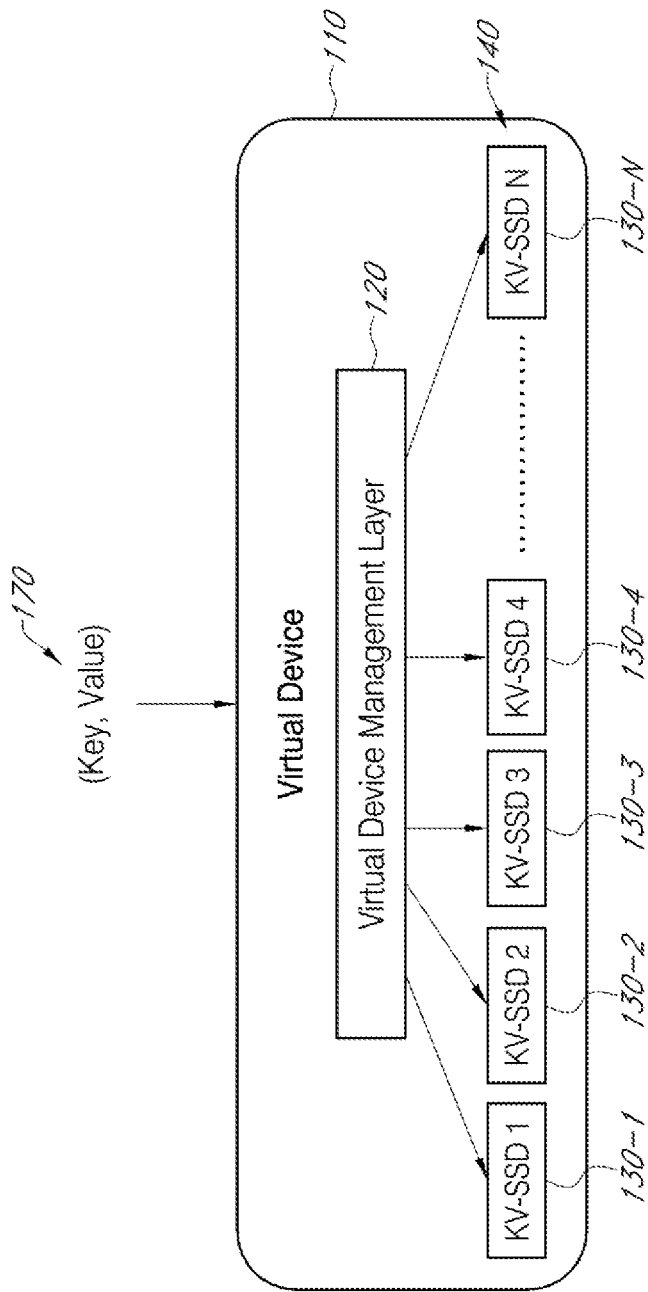
FIG. 1 is a block diagram depicting a key-value reliability system for storing key-value data based on a selected reliability mechanism, according to an embodiment of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present invention.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As will be described below, embodiments of the present disclosure provide a method to reliably store key-value data in a key-value reliability system comprised of a plurality of key-value (KV) storage devices that are grouped into one logical unit. Furthermore, embodiments of the present disclosure provide a stateless hybrid reliability manager to manage the drives and control the storage of key-value (KV) pairs, that relies on multiple pluggable reliability mechanisms/techniques/implementations including: Object Replication; K-Object (k,r) erasure coding—Packing; Single Object (k,r) erasure coding—Splitting; K-Object (k,r,d) regeneration coding—Packing; Single Object (k,r,d) regeneration coding—Splitting.

The described embodiments enable improved memory storage (e.g., storage of key-value data in key-value storage devices), as a stateless hybrid reliability manager, which relies on multiple pluggable reliability mechanisms, may manages the devices and may control the storage of KV pairs, and as the disclosed methods of reliability mechanism selection ensure efficient storage, retrieval, and repair of KV pairs of different sizes.

FIG. 1 is a block diagram depicting a key-value reliability system for storing key-value data based on a selected reliability mechanism, according to an embodiment of the present disclosure.

Referring to FIG. 1, as mentioned above, many new key-value (KV) storage devices/memory devices/drives/KV-SSDs 130 may potentially benefit from new data reliability mechanisms tailored to, or adopted for, key-value data and KV storage devices 130. Accordingly, a hybrid key-value reliability system for such KV storage devices 130 may include a stateless hybrid reliability manager/virtual device manager layer/virtual device management layer 120 configured to employ a hybrid reliability mechanism to manage the KV storage devices 130, and to control the storage of KV pairs therein according to one or more pluggable reliability mechanisms. It should be noted that, although solid-state drives (SSDs) are generally used to refer to the KV storage devices described herein, other storage devices may be used in accordance with embodiments of the present disclosure. The design and operations of the virtual device management layer 120 according to embodiments of the present disclosure will be described below.

In the present embodiment, the virtual device management layer 120 may enable a method of reliably storing key-value data/a KV pair 170 in a key-value reliability system. The key-value reliability system may include a plurality of KV storage devices 130 that are grouped together into one logical unit. The logical unit may be referred to as a reliability group 140.

The KV storage devices 130 of the reliability group 140 may store respective chunks of erasure coded data and/or replicated data, which may correspond to the key-value data 170. The KV storage devices 130 in the reliability group 140 exposes a single virtual device 110 to which key-value operations are directed via the virtual device management layer 120.

The virtual device 110 may have a stateless hybrid reliability manager as the virtual device management layer 120. That is, the virtual device management layer 120 may work in a stateless manner (i.e., without any need to maintain any key-value-to-device mapping).

Accordingly, the virtual device 110 may store the key-value data 170 across N KV storage devices 130, N being an integer, (e.g., KV-SSDs 130-1, 103-2, 130-3, 130-4 . . . 130-N), and may store the key-value data 170 in the KV storage devices 130 via the virtual device management layer 120. That is, the virtual device management layer 120 may manage the KV storage devices 130, and may control the storage of KV pairs therein.

In other embodiments, the key-value reliability system may also include a cache to optionally store data and/or metadata associated with keys of the key-value data 170 to increase operation speed. The reliability mechanisms may append a value of a KV pair to include the metadata corresponding to the KV pair. That is, both a key and a value may be appended with information corresponding to a metadata identifier "MetaID" to store additional metadata specific to that KV pair. The metadata may include a checksum, a reliability mechanism identifier for identifying the reliability mechanisms used to store the data, an erasure code identifier, object sizes, location of parity group members, etc.

In other embodiments, the key-value reliability system may also include bloom filters corresponding to the reliability mechanisms described below. The bloom filters may store keys that are stored using the corresponding reliability mechanism, thereby aiding the key-value reliability system in read operations. Accordingly, the one or more bloom filters or caches of the key-value reliability system may enable quickly testing keys for existing reliability mechanisms.

Each of the reliability mechanisms described herein may first store the first copy or chunk of the KV pair corresponding to the key-value data 170 using the same hash function on the key modulo of the number of the corresponding one of the KV storage devices 130. That is, for each of the pluggable reliability mechanisms, the reliability mechanism may store at least the first copy/chunk using the same key as the user key.

As discussed above, embodiments of the present disclosure provide multiple pluggable reliability mechanisms for ensuring reliable storage of key-value data 170 in the plurality of KV storage devices 130. Accordingly, the virtual device management layer 120 may rely on the reliability mechanisms, and may determine which of the reliability mechanisms to use.

The reliability mechanisms may be based on policies such as value-size thresholds that are set during setup of the virtual device 110, and/or object read/write frequency. Accordingly, the virtual device management layer 120 may select an appropriate reliability mechanism based on the dictated policies of the system.

Five reliability mechanisms of embodiments of the present disclosure, how the reliability mechanisms work, and when the reliability mechanisms may be suitably used and selected by the virtual device management layer 120 are described below. Such reliability mechanisms may include techniques that may be referred to as Object Replication, K-Object (k,r) erasure coding—Packing, Single Object (k,r) erasure coding—Splitting, K-Object (k,r,d) regeneration coding—Packing, and Single Object (k,r,d) regeneration coding—Splitting.

Figure 2:
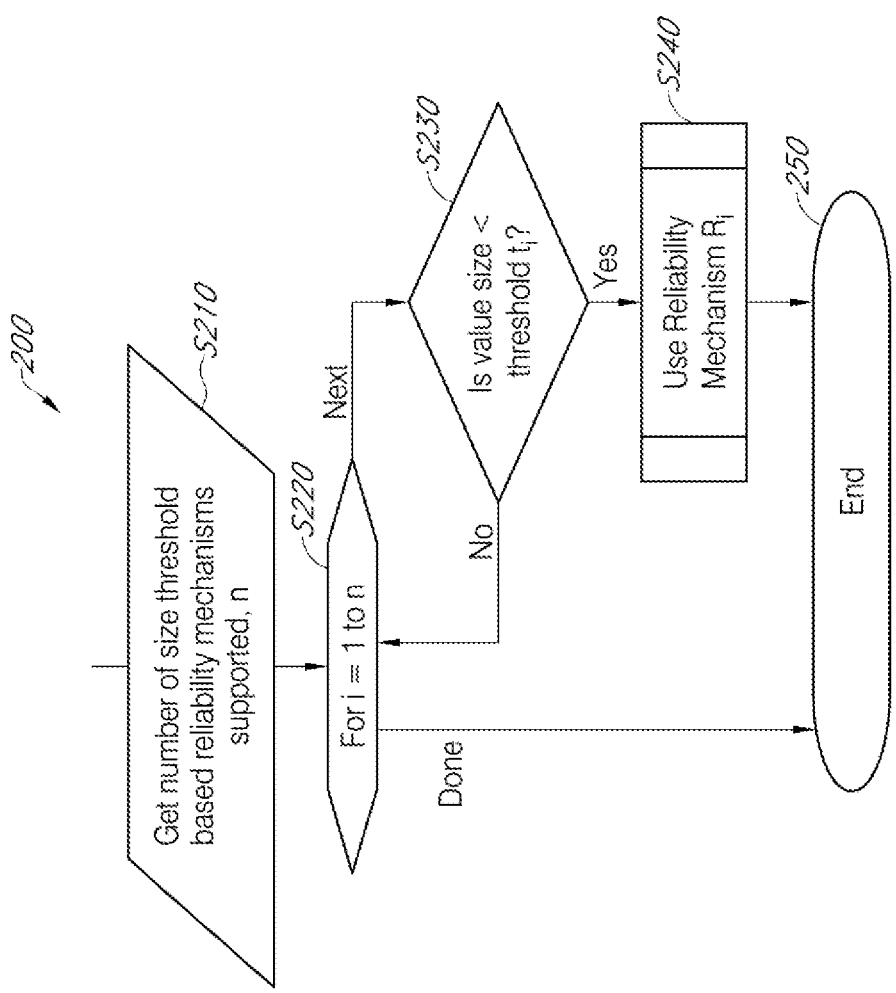
FIG. 2 is a flowchart depicting selection of a reliability mechanism to be used by a key-value reliability system based on a size threshold corresponding to a size of data of a key-value pair, according to an embodiment of the present disclosure.

FIG. 2 is a flowchart 200 depicting selection of a reliability mechanism to be used by a key-value reliability system based on a size threshold corresponding to a size of data of a KV pair, according to an embodiment of the present disclosure.

Referring to FIG. 2, for as many as all of the supported reliability mechanisms that are based on size threshold (e.g., the five aforementioned reliability mechanisms), the virtual device management layer 120 may determine a value size of data (e.g., of key-value data 170), may determine whether the value size is less than a given threshold $t_i$ corresponding to the respective reliability mechanism, and may select the first reliability mechanism in which the value size threshold requirement is met.

For example, at S210, the virtual device management layer 120 may receive a number "n" of size threshold-based reliability mechanisms that are supported, n being an integer. At S220, the virtual device management layer 120 may simply review each of the reliability mechanisms, one at a time, in order from 1 to n. At S230, in its review of each of the supported reliability mechanisms, the virtual device management layer 120 may determine whether the value size of the data is less than the threshold $t_i$ corresponding to the respective reliability mechanism.

At S240, upon finding a reliability mechanism that has a threshold $t_i$ that is greater than or equal to the value size of the data, the virtual device management layer 120 may select that reliability mechanism for use. At S250, either upon determining which reliability mechanism to use at S240, or upon determining that none of then reliability mechanisms has a threshold $t_i$ that is suitable for accommodating the value size at a final iteration of S220, the virtual device management layer 120 may end its determination of which reliability mechanism to use.

In the present embodiment, "n" may equal 5 in accordance with the five different reliability mechanisms of the embodiments described herein. For relatively very small key-values (i.e., where value size is relatively small), the virtual device management layer 120 may select the reliability mechanism of Object Replication for use. For slightly larger key-values, the virtual device management layer 120 may select the reliability mechanisms of Packing, and then Splitting (e.g., in that order), while using traditional erasure coding for each. However, for even larger key-values, the virtual device management layer 120 may select Packing, and then Splitting, while using regeneration erasure coding instead of traditional erasure coding.

In embodiments of the present disclosure, selection of a reliability mechanism for use may be based on one or more of object size of an object, throughput requirements for the object, read/write temperature of a corresponding key-value-pair, underlying coding capabilities of the plurality of KV storage devices, and/or detection of whether a key is hot or cold. For example, "hot" keys, irrespective of their value size, can use the reliability mechanism of Object Replication, while "cold" keys can be applied to one of the reliability mechanisms of the erasure-coded schemes depending on the value size thereof. As another example, the decision of whether to use the reliability mechanism of Object Replication can be based on both size and write temperature. Accordingly, a threshold corresponding to object read/write frequency may be used in the flowchart 200 of FIG. 2, instead of the threshold corresponding to size, to determine a reliability mechanism.

The respective operations of the five reliability mechanisms are discussed below.

Referring back to FIG. 1, and as mentioned before, when the value size of the KV pair is relatively low, the reliability mechanism of "Object Replication" may be suitable for selection by the virtual device management layer 120. Object Replication may be applied per object (e.g., per KV pair/key-value data 170). Although the reliability mechanism of Object Replication may have high storage overhead, it also has low read and recovery costs, which is why it may be suitable for very small value sizes.

The reliability mechanism of Object Replication may also be suitable for key-values (e.g., key-value data 170) having frequent updates, and may therefore be chosen based on read and write frequency.

During Object Replication, the object/key-value data 170 is replicated to one or more additional KV storage devices 130 whenever a write occurs. A primary copy of the key-value data 170 may be placed on one of the KV storage devices 130 pointed by a hash of the key modulo N. Replicas of the primary copy of the key-value data 170 may be placed on immediately adjacent KV storage devices 130, or consecutive KV storage devices 130, in a circular manner.

The virtual device management layer 120 or a user may decide how many replicas of the key-value data 170 are made. For example, a distributed system employing the virtual device management layer 120 may choose 3-way replication, and may make 3-way replication the default. However, a user of the system may be able to configure the number of replicas of the object to be more or less than the selected default.

Accordingly, and for example, if 3-way replication is used, if a primary KV storage device 130-2 has a primary copy of the data (e.g., the key-value data 170), then the virtual device management layer 120 may store replicas of the primary copy of the data on subsequent replica KV storage devices 130-3 and 130-4, all copies of the data being identical. That is, copies of the data may be stored on the two (or more) immediately subsequent KV storage devices 130-3 and 130-4 (e.g., in a circular manner) following the KV storage device 130-2 having the primary copy of the data.

The copies of the data may be stored under the same keyname/same user key as the primary KV storage device 130-2 as in the replica KV storage devices 130-3 and 130-4. All copies of the data can contain a checksum and an identifier for indicating the key-value data 170 that has been replicated.

Accordingly, if an entire KV storage device 130 fails (e.g., if KV storage device 130-3 fails), by recovering the value using a recovery mechanism with respect to key names on KV storage devices 130 immediately before and after the failed KV storage device 130 (e.g., KV storage devices 130-2 and 130-4 immediately before and after KV storage device 130-3) ensures that a replicated key is also recovered.

To summarize the reliability mechanism of Object Replication, the virtual device management layer 120 may receive a key-value data 170, and may hash a key object to thereby determine which KV storage devices 130 to use for storing replicas of the key object. The virtual device management layer 120 may then write updated values under a same user keyname (e.g., with an appropriate MetaID field) to the selected KV storage devices 130 (e.g., selected KV storage devices 130-2, 130-3, and 130-4).

Figure 3:
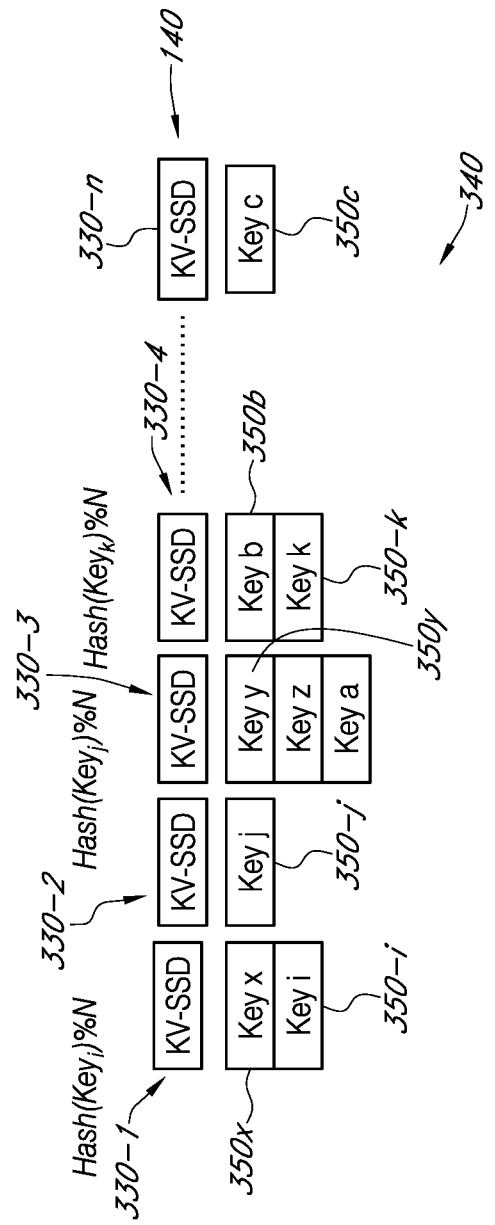
FIG. 3 is a block diagram depicting a group of KV storage devices configured to store key-value data according to a reliability mechanism of K-Object (k,r) erasure coding, or multiple object "Packing," using traditional erasure coding, according to an embodiment of the present disclosure.

FIG. 3 is a block diagram depicting a group of KV storage devices configured to store key-value data according to a reliability mechanism of K-Object (k,r) erasure coding, or multiple object "Packing," using traditional erasure coding, according to an embodiment of the present disclosure.

Referring to FIG. 3, the reliability mechanism of Packing using traditional erasure coding may be selected for data having small value sizes that is not suitable for being split into chunks (e.g., for the sake of better throughput of the data). For example, the reliability mechanism of Packing using traditional erasure coding may be selected by the virtual device management layer 120 for data having value sizes that are bigger than the value sizes that result in selection of the previously described reliability mechanism of Object Replication, but that are still relatively small.

Packing using traditional erasure coding may be configured with a traditional (k,r) maximum distance separable (MDS) erasure coding, and may be used with any systemic MDS code. As an example, the erasure code could be (4,2) Reed-Solomon code by default, as (4,2) Reed-Solomon code is relatively well studied, and fast implementation libraries corresponding thereto are readily available.

In using the reliability mechanism of Packing using traditional erasure coding, k keys/key objects 350 from the queues of k different KV storage devices 330 that are part of the same parity group/erasure code group 340 are picked and erasure coded to be packed, k being an integer.

For example, the virtual device management layer 120 may maintain a buffer of recently written key objects 350 for each KV storage device 330 (e.g., each KV storage device 130 of the reliability group 140 of FIG. 1) to enable the virtual device management layer 120 to choose k key objects 350 from k different KV storage devices 330 to be erasure coded to thereby pack the k key objects 350 corresponding to the KV pairs.

In the present example, the virtual device management layer 120 chooses four key objects 350$x$, 350$y$, 350$b$, and 350$c$ from four different KV storage devices 330-1, 330-3, 330-4, and 330-N, respectively (i.e., k=4 in the present example).

Figure 4:
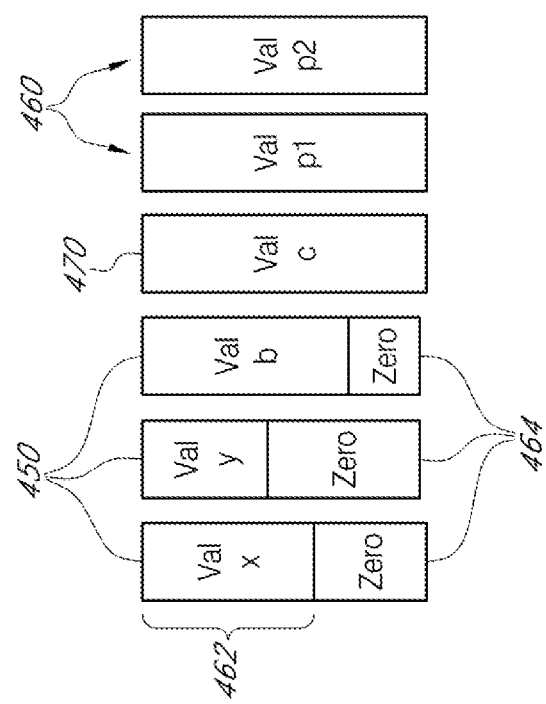
FIG. 4 is a block diagram depicting storage of value objects and parity objects in accordance with the reliability mechanism of K-Object (k,r) erasure coding, or multiple object "Packing," using traditional erasure coding, according to an embodiment of the present disclosure.

FIG. 4 is a block diagram depicting storage of value objects and parity objects in accordance with the reliability mechanism of K-Object (k,r) erasure coding, or multiple object "Packing," using traditional erasure coding, according to an embodiment of the present disclosure.

Referring to FIGS. 3 and 4, again the key objects 350 are placed in a (hash of the key modulo n)$^{th}$ KV storage device 330. That is, for each key object 350, there may be performed a respective hash of the key modulo n, which may be sent to the queue of that particular KV storage device 330. In the present example, Key$_i$ 350-$i$ is hashed and placed in KV-SSD 1 330-1, Key$_j$ 350-$j$ is hashed and placed in KV-SSD 2 330-2, and Key$_k$ 350-$k$ is hashed and placed in KV-SSD 4 330-4.

The user value length/value size 462 of the respective value objects 450 that are stored is the same as what was written. However, for the sake of consistency to enable erasure coding, the user values/value objects 450 are seen as all being the same size by having '0' fillings/virtual zeroes/virtual zero padding 464 appended thereto. That is, because respective user value sizes 462 of different value objects 450 may vary (i.e., the value objects 450 may have varying lengths/are variable-length key values), by implementing a method of virtual zero padding 464 (i.e., by padding the value objects 450 with zeroes of the virtual zero padding 464 for coding purposes, while avoiding actually rewriting the data representing the value objects 450 to include the padded zeroes), the parity objects 460 are able to be the same size as the largest value object(s) 470 in the parity group 340. Accordingly, in the present example, value objects 450 "Val x," "Val y," and "Val b" are padded with virtual zeroes not actually stored in any of the KV storage devices 330 to thereby appear to be the same size as value object 470 "Val c." Thereafter, the parity objects 460 may be calculated.

After coding of the k key objects 350, the virtual device management layer 120 may compute r parity objects 460 from the k values/k value objects 450 corresponding to the k key objects 350, where r is an integer, where k+r=N, and where N is the number of KV storage devices 330 in the parity group 340 (e.g., the N KV storage devices 130 of the reliability group 140 of FIG. 1).

The virtual device management layer 120 may store the r parity objects 460 in r remaining different KV storage devices 330 in the parity group 340 (i.e., in r KV storage devices 330 that are separate from the k KV storage devices 330 having the queues from which the k key objects 350 are picked and erasure coded). Accordingly, each of the k key objects 350 and r parity objects 460 may be stored in different respective ones of the N KV storage devices 330, and the data corresponding thereto is equally distributed in each of the N KV storage devices 330 of the parity group 340.

Although reads and writes are relatively straightforward for the reliability mechanism of Packing using traditional erasure coding, recovery and recalculation of parity may be less simple. For recovery and recalculation of parity (e.g., in the event of an update), to enable knowledge of which key objects 350 are grouped together in the same parity group 340 to thereby enable calculation of parity (e.g., which key objects 350 are in an erasure code group 340), information regarding the groupings of key objects 350, along with the actual value size 462 of each value object 450 (i.e., the value size 462 without the virtual zero padding 464), may be stored as a metadata object in each of the KV storage devices 330 (e.g., the KV storage devices 130 of FIG. 1). Accordingly, in the present embodiment, additional metadata may be used to store the key objects 350 (e.g., the key objects 350 that are located in the reliability group 140 of FIG. 1), the original length of each of the value objects 450 corresponding to the key objects 350, and the KV storage devices 130 in order of the coding of the key objects 350.

For example, the metadata object value may have a field indicating all of the key objects 350 of the reliability group 140, and also indicating the value sizes 462 of the value objects 450, and may have another field indicating the parity objects keys (i.e., the value objects 450 including the zeroes of the virtual zero padding 464), the value sizes 462 of the parity objects 460, and device IDs for identification of the corresponding r KV storage device 330 in which the r parity objects 460 are stored.

The data may be stored using the user key. The metadata may be stored in an internal key formed using the user key and a MetaID indicator denoting "Metadata." Further, the value sizes 462 may be stored in the metadata to enable knowledge of the location of the virtual zero padding 464 (i.e., where the zeroes are added) for accurate reproduction when the value objects 450 are recreated by determining where the value objects 450 end and the zeroes of the virtual zero padding 464 begin.

Should one of the KV storage devices 330 fail, because both of the data and the metadata may be stored in a same KV storage device 330, both of the data and the metadata could potentially be lost, thereby making recovery impossible. However, to avoid such a scenario, the metadata object value may be replicated using an "Object Replication Engine" of the virtual device management layer 120 that is capable of implementing the previously mentioned reliability mechanism of Object Replication on the metadata object value.

Additionally, because the metadata object value is the same for all of the objects in a reliability group 140, if the KV storage device 330 supports object linking, the same metadata object value can be linked to multiple keynames that are commonly located in the same KV storage device 330. Furthermore, if batch writing is supported, object values can be batched together for better throughput.

To summarize the reliability mechanism of Packing using traditional erasure coding according to the present embodiment, the virtual device management layer 120 may pick k recently stored key objects 350 from k different KV storage devices 330 via a buffer. The virtual device management layer 120 may then retrieve and pad the value objects 450 corresponding to the respective key objects 350 (other than a largest value object(s) 470 of the parity group 440) with virtual zero padding 464 to make the value objects 450 the same size (e.g., the size of the largest value object(s) 470). The virtual device management layer 120 then may use MDS code process to create r parity objects 460 from the k key objects 350. The virtual device management layer 120 may then write the r parity objects 460 to r KV storage devices 330 that are other than the k KV storage devices 330 from where the key objects 350 were selected of the N KV storage devices 330, k+r being equal to N. The virtual device management layer 120 may then create a metadata object representing the above information. Finally, the virtual device management layer 120 may write the key objects 350 and parity objects 460 to N KV storage devices 330 (e.g., similar to a replication engine) and with keys formed of user key and metadata identifier.

Figure 5:
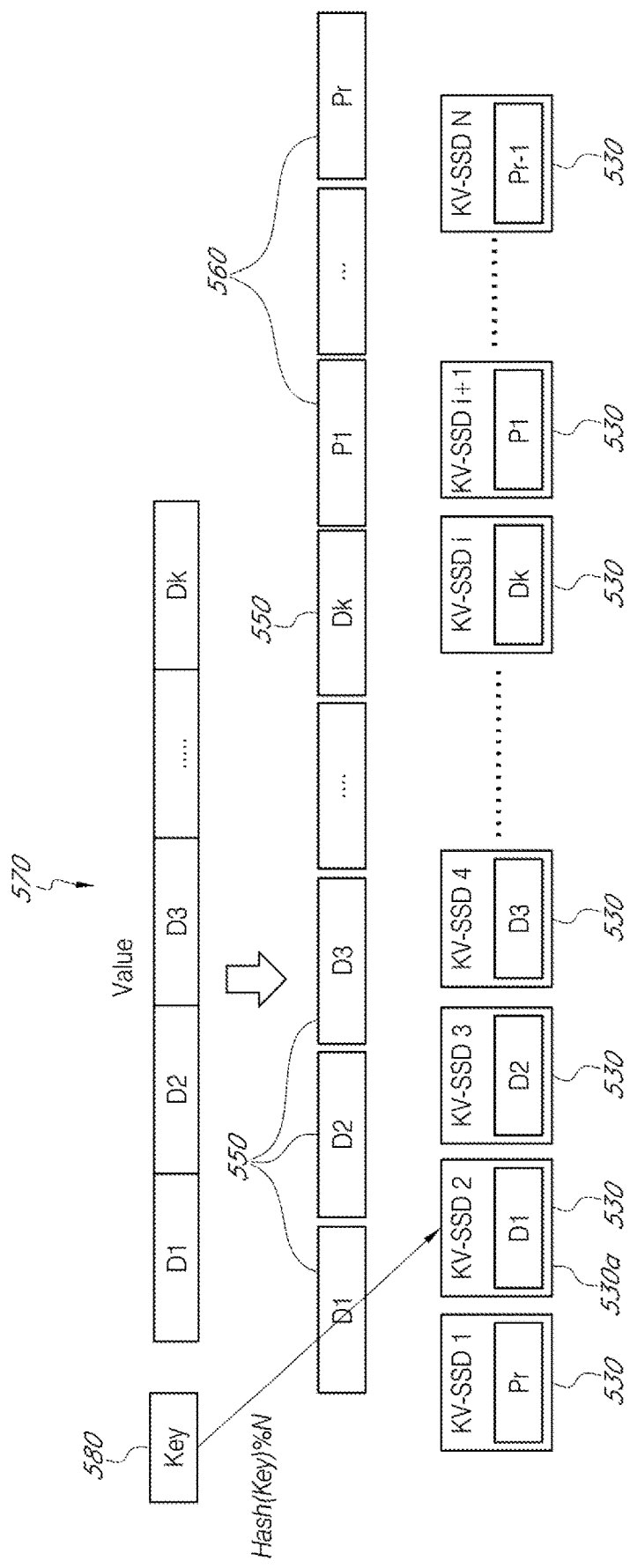
FIG. 5 is a block diagram depicting a group of KV storage devices configured to store key-value data according to a reliability mechanism of Single Object (k,r) erasure coding, or "Splitting," using traditional erasure coding, according to an embodiment of the present disclosure.

FIG. 5 is a block diagram depicting a group of KV storage devices configured to store key-value data according to a reliability mechanism of Single Object (k,r) erasure coding, or "Splitting," using traditional erasure coding, according to an embodiment of the present disclosure.

Referring to FIG. 5, for values having value sizes that are bigger than the value sizes of the values that are suitable for the previously described reliability mechanisms of Object Replication and Packing using traditional erasure coding, the virtual device management layer 120 may select the reliability mechanism of Single Object (k,r) erasure coding, or "Splitting," using traditional erasure coding. The reliability mechanism of Splitting using traditional erasure coding is a per-object/KV pair reliability mechanism that may be suitable for a KV value/object 570 that has a relatively large value size, and that will have good throughput when the KV value 570 is split into k equal-sized splits/chunks/values/objects 550.

After splitting the KV value 570, according to an embodiment, the virtual device management layer 120 may calculate a checksum for each of the k objects 550. Thereafter, the virtual device management layer 120 may insert metadata before each of the k objects 550.

Splitting using traditional erasure coding may include splitting the KV value 570 into multiple smaller objects 550, and then distributing the multiple smaller objects 550 of the KV value 570 over k consecutive storage devices 530. Accordingly, the size of the k equal-sized objects 550 may be supported by each of the underlying KV storage devices 530.

When using Splitting using traditional erasure coding, the virtual device management layer 120 may also add r parity values/objects 560 that are created using a systemic MDS code (e.g., the virtual device management layer 120 may be configured with a traditional (k,r) MDS erasure coding, such as (4,2) Reed Solomon code as the default the code). Then, in a manner similar to the reliability mechanism of Packing using traditional erasure coding described above, the virtual device management layer 120 may write the k objects 550 and the r parity objects 560 to N KV storage devices 530 (k+r=N).

Accordingly, the virtual device management layer 120 may spilt a relatively large KV value 570 into k objects 550, may compute and add r parity objects 560, and may store the k objects 550 and r parity objects 560 in k+r KV storage devices 530.

In using the reliability mechanism of Splitting using traditional erasure coding, after hashing a key 580 corresponding to the KV value 570, the virtual device management layer 120 may determine a primary KV storage device 530a (e.g., KV-SSD 2 in the example shown in FIG. 5) for storing a corresponding object (e.g., a first of the k objects 550, D1 in the example shown in FIG. 5, may be stored in a hash mark zero). Then the k+r objects 550, 560 may be written under the same user keyname to respective ones of the primary KV storage device 530a and N-1 consecutive KV storage devices 530. That is, in the example shown in FIG. 5, a first of the k objects 550 may be written in the primary KV storage device 530a "KV-SSD 2," and the rest of the k objects 550 along with the r parity objects 560 are written in order in a circular fashion in in KV storage devices 530 "KV-SSD 3" through "KV-SSD N" and "KV-SSD 1" (e.g., in a manner similar to that described with respect to the reliability mechanism of Object Replication described above).

To summarize the reliability mechanism of Splitting using traditional erasure coding, the virtual device management layer 120 may split a relatively large KV value 570 into k equally sized objects 550. The virtual device management layer 120 may then use MDS code process to create r parity objects 560 for the k objects 550. The virtual device management layer 120 may then hash the key corresponding to the KV value 570 to determine a primary KV storage device 530a in which to place the object. The virtual device management layer 120 may then write the k+r objects 550, 560 under a same user keyname, which may include an appropriate MetaID field created by the virtual device management layer 120 and corresponding to the primary KV storage device 530a and N-1 consecutive KV storage devices 530 in a circular fashion.

Referring back to FIGS. 3 and 4, according to another embodiment, the virtual device management layer 120 may select the reliability mechanism of K-Object (k,r) erasure coding, or multiple object "Packing," using regeneration erasure coding (e.g., in accordance with the flowchart 200 of FIG. 2). The present reliability mechanism is similar to the previously described reliability mechanism of Packing using traditional erasure coding, in that the virtual device management layer 120 packs k-objects in k KV storage devices. However, Packing using regeneration erasure coding uses (k,r,d) regeneration codes, instead of using traditional (k,r) erasure codes. Accordingly, FIGS. 3 and 4 may generally be referenced with respect to the present embodiment.

Accordingly, Packing using regeneration erasure coding can be used when regeneration codes are suitable, but when it is not suitable to split the objects/when it is more suitable to have the objects intact. Packing using regeneration erasure coding may be suitable for value sizes that are bigger than those used for the previously described reliability mechanisms of Object Replication, and Packing and Splitting using traditional erasure coding. Packing using regeneration erasure coding may be used when reading multiple subpackets of an object does not result in lower performance than reading the entire object. Packing using regeneration erasure coding may also be suitable when the underlying KV storage devices (e.g., KV storage devices 130 of FIG. 1, or KV storage devices 330 of FIG. 3) are regeneration code aware KV storage devices that are able to assist during repair/reconstruction.

Figure 6:
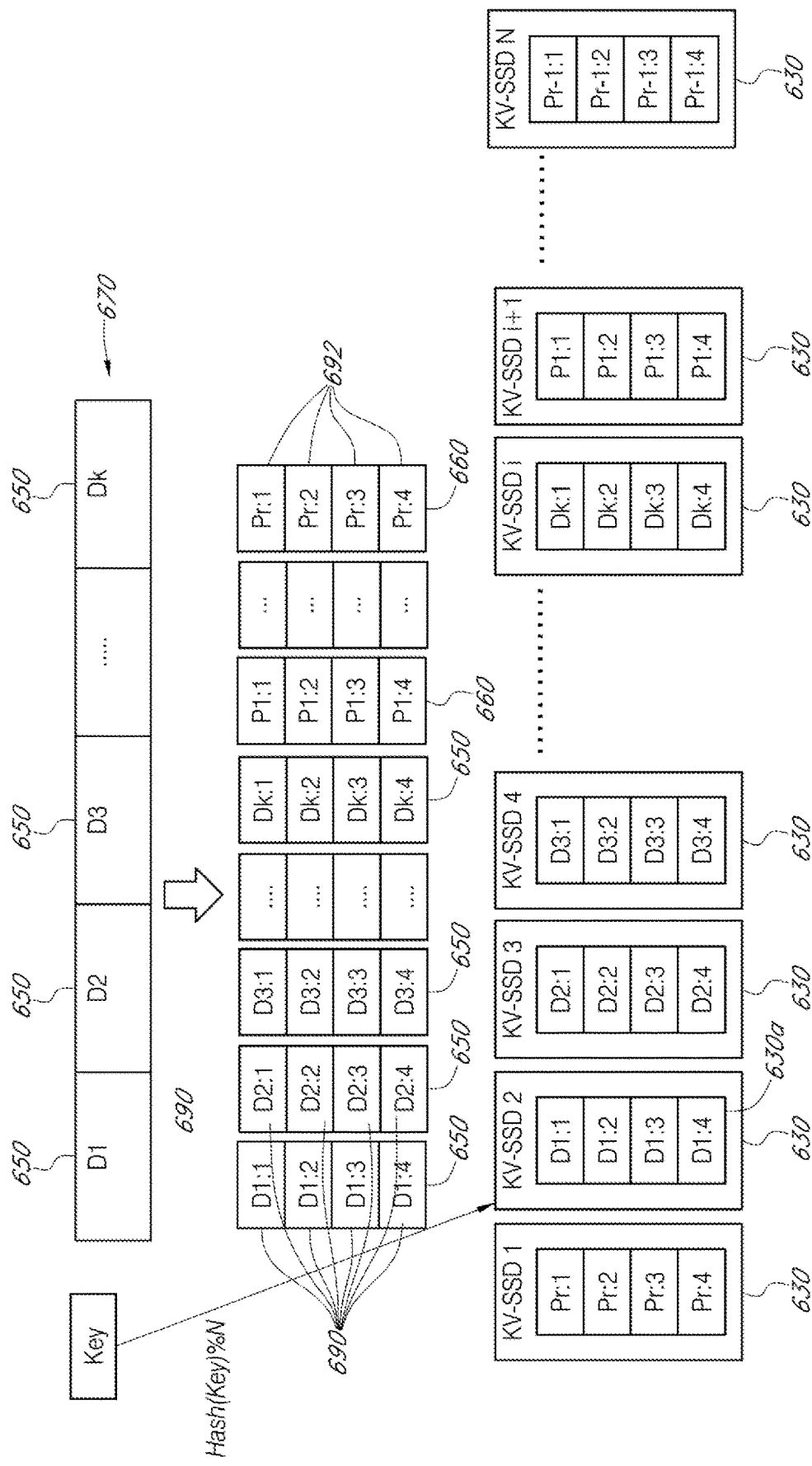
FIG. 6 is a block diagram depicting a group of KV storage devices configured to store key-value data according to a reliability mechanism of Single Object (k,r,d) erasure coding, or "Splitting," using regeneration erasure coding, according to an embodiment of the present disclosure.

FIG. 6 is a block diagram depicting a group of KV storage devices configured to store key-value data according to a reliability mechanism of Single Object (k,r,d) erasure coding, or "Splitting," using regeneration erasure coding, according to an embodiment of the present disclosure.

Referring to FIG. 6, the present reliability mechanism allows the virtual device management layer to work in a manner that is similar to Splitting using traditional erasure coding, as shown in FIG. 4, except that (k,r,d) regeneration codes are used instead of traditional (k,r) MDS erasure coding. As with Packing using regeneration erasure coding, the present reliability mechanism may be suitable when underlying KV storage devices 630 are regeneration code aware KV storage devices 630 that assist during repair/reconstruction.

Splitting using regeneration erasure coding may be suitable when an object 670 has a value size that is bigger than the objects corresponding to the previously described reliability mechanisms, and when reading multiple subpackets 690 of k splits 680 of the object 670 does not result is lower performance than reading the entire splits 680 (e.g., as is done with Splitting reliability mechanism using traditional erasure coding).

The reliability mechanism of Splitting using regeneration erasure coding is a per-object (KV pair) mechanism that may be suitable for objects/KV values 670 having very big value sizes that will have suitable throughput even when the object 670 is split into k equal-sized objects/splits 650 and when the splits 650 are further virtually split into a number of subpackets 690 (e.g., 4 subpackets 690 per split 650 in the present example), and when reading multiple subpackets 690 from an object 670 has better throughput than reading the entire object 670, where the value size is supported by all underlying KV storage devices 630.

Similarly to Splitting using traditional erasure coding, as shown in FIG. 4, the virtual device management layer 120 of the present reliability mechanism may add r parity objects 660 using a systemic regeneration code, and may write the k splits 650 and the r parity objects 660 to N KV storage devices 630 (k+r=N). However, each of the r parity objects 660 may be split into a number of parity subpackets 692 (e.g., a number corresponding to the number of subpackets 690 per split/k object 650). Unlike Splitting using traditional erasure coding, the default code in the present embodiment can be (4,2,5) zigzag code.

To summarize the reliability mechanism of Splitting using regeneration erasure coding, the virtual device management layer 120 may split a large KV value 670 into k equally sized objects 650. The virtual device management layer 120 may then split each of the k objects 650 into m equally sized subpackets 690, m being an integer. The virtual device management layer 120 may then use a regeneration coding process to create r parity objects 660 for the k objects 650, and each of the r parity objects 660 may be split into m equally sized parity subpackets 692. The virtual device management layer 120 may then hash the key corresponding to the KV value 670 to determine a primary KV storage device 630a in which to place the object. The virtual device management layer 120 may then write the k+r objects 650, 660 including m subpackets 690, 692 for each under a same user keyname, which may include an appropriate MetaID field created by the virtual device management layer 120 and corresponding to the primary KV storage device 630*a* and N-1 consecutive KV storage devices 630 in a circular fashion.

According to the above, a virtual device management layer may select a suitable reliability mechanism from a group of reliability mechanisms for storage of data based on one or more characteristics of the data. Accordingly, the embodiments described herein provide improvements to the field of memory storage, as the reliability mechanisms described are each capable of a single key repair procedure. When an entire memory device fails, the virtual device management layer of embodiments of the present disclosure can repair and copy all of the keys present in the failed memory device to a new memory device. The virtual device management layer can accomplish repair and copy all of the keys by iterating over all of the keys present in the memory devices that are adjacent to the failed memory device in the reliability group, and by doing per key repairs on the keys that the reliability mechanism determines to have been on the failed memory device.

The embodiments described herein further provide improvements to the field of memory storage because very large KV pairs with value sizes that are bigger than that which is supported by the underlying reliability mechanisms (e.g., in accordance with the underlying storage devices size restrictions) are explicitly split into multiple KV pairs by the reliability manager, and because the reliability mechanisms store the number of splits and split number information along with the metadata stored in the values.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A method of storing data in a key-value reliability system comprising one or more storage devices that are grouped into a reliability group as a single logical unit and that are managed by a virtual device management layer, the method comprising:
determining the data meets a threshold corresponding to a reliability mechanism for storing the data, the reliability mechanism comprising object replication;
using the reliability mechanism indicated by a reliability mechanism identifier that is contained in metadata and that identifies the reliability mechanism; and
storing the data according to the reliability mechanism by:
selecting a KV value;
calculating a hash for hashing a key corresponding to the KV value;
determining a subset of storage devices of the one or more storage devices for storing a replica of a key object corresponding to the KV value; and
writing an updated value corresponding to the KV value to the subset of storage devices under a same user keyname.

2. The method of claim 1, wherein the threshold is based on one or more of: object size of the data; throughput consideration of the data; read/write temperature of the data; and an underlying erasure coding capability of the one or more storage devices.

3. The method of claim 1, further comprising using a bloom filter or a cache for testing the data for the reliability mechanism.

4. The method of claim 1, further comprising inserting the metadata with a key corresponding to the data for recording the reliability mechanism, the metadata comprising a checksum for the one or more storage devices storing the data, an object size of a value of the data stored in the one or more storage devices storing the data, and a location of a member of a parity group of the one or more storage devices for indicating which of the one or more storage devices are storing the data.

5. The method of claim 1, wherein the reliability mechanism comprises packing, and wherein storing the data comprises:
selecting one or more key objects respectively stored in a same number of first respective one or more storage devices of the one or more storage devices of the reliability group;
retrieving one or more value objects corresponding to the one or more key objects;
padding a virtual zero on an end of one of the one or more value objects that does not have a largest value size of the one or more value objects to make a virtual value size of the one or more value objects equal;
creating one or more parity objects from the one or more key objects;
writing the one or more key objects to the first respective one or more storage devices; and
writing the one or more parity objects to a same number of second respective one or more storage devices of the one or more storage devices, the second respective one or more storage devices being distinct from the first respective one or more storage devices,
wherein a number of the one or more key objects plus a number of the one or more parity objects is equal to a number of the one or more storage devices.

6. The method of claim 5, wherein the reliability mechanism comprises packing using erasure coding, and
wherein the one or more storage devices are configured with maximum distance separable (MDS) erasure coding.

7. The method of claim 5, wherein the reliability mechanism comprises packing using regeneration erasure coding, and
wherein the one or more storage devices are configured with regeneration erasure coding.

8. The method of claim 1, wherein the reliability mechanism comprises splitting, and wherein storing the data comprises:
splitting the KV value into one or more equally sized objects; creating one or more parity objects from the one or more equally sized objects;
determining a primary device of the one or more storage devices in which to place the KV value based on the hash; and
writing one or more value objects in a same number of first respective one or more storage devices of the one or more storage devices, and writing one or more parity objects in a same number of second respective one or more storage devices of the one or more storage devices, in consecutive order and starting with the primary device, the one or more storage devices being distinct from the first respective one or more storage devices, wherein a number of the one or more value objects plus a number of the one or more parity objects is equal to a number of the one or more storage devices.

9. The method of claim 8, wherein the reliability mechanism comprises splitting using erasure coding, and
wherein the one or more storage devices are configured with a maximum distance separable (MDS) erasure coding.

10. The method of claim 8, wherein the reliability mechanism comprises splitting using regeneration erasure coding,
wherein the one or more storage devices are configured with regeneration erasure coding, and
wherein storing the data further comprises using the regeneration erasure coding to split the one or more equally sized objects into one or more subpackets, and splitting the one or more parity objects into one or more parity subpackets.

11. A data reliability system for storing data based on a reliability mechanism, the data reliability system comprising:
one or more storage devices configured as a virtual device using stateless data protection; and
a virtual device management layer configured to manage the one or more storage devices as the virtual device to store data in the one or more storage devices according to a reliability mechanism comprising object replication, the virtual device management layer being configured to:
determine a threshold corresponding to a reliability mechanism for storing the data;
use the reliability mechanism indicated by a reliability mechanism identifier that is contained in metadata and that identifies the reliability mechanism; and
store the data according to the reliability mechanism by:
selecting a KV value;
calculating a hash for hashing a key corresponding to the KV value;
determining a subset of storage devices of the one or more storage devices for storing a replica of a key object corresponding to the KV value; and
writing an updated value corresponding to the KV value to the subset of storage devices under a same user keyname.

12. The data reliability system of claim 11, wherein the reliability mechanism comprises packing, and wherein the virtual device management layer is configured to store the data by:
selecting one or more key objects stored in a same number of first respective one or more storage devices of the one or more storage devices;
retrieving one or more value objects corresponding to the one or more key objects;
padding a virtual zero on an end of one of the one or more value objects that does not have a largest value size of the one or more value objects to make a virtual value size of the one or more value objects equal;
creating one or more parity objects from the one or more key objects;
writing the one or more key objects to the first respective one or more storage devices; and writing the one or more parity objects to a same number of second respective one or more storage devices of the one or more storage devices, the second respective one or more storage devices being distinct from the first respective one or more storage devices,
wherein a number of the one or more key objects plus a number of the one or more parity objects is equal to a number of the one or more storage devices.

13. The data reliability system of claim 11, wherein the reliability mechanism comprises splitting, and wherein the virtual device management layer is configured to store the data by:
splitting the KV value into one or more equally sized objects;
creating one or more parity objects from the one or more equally sized objects;
determining a primary device of the one or more storage devices in which to place the KV value based on the hash; and
writing one or more value objects in a same number of first respective one or more storage devices of the one or more storage devices, and writing one or more parity objects in a same number of second respective one or more storage devices of the one or more storage devices, in consecutive order and starting with the primary device, the second respective one or more storage devices being distinct from the first respective one or more storage devices,
wherein a number of the one or more value objects plus a number of the one or more parity objects is equal to a number of the one or more storage devices.

14. The data reliability system of claim 13, wherein the reliability mechanism comprises splitting using regeneration erasure coding,
wherein the one or more storage devices are configured with (k,r,d) regeneration erasure coding, and
wherein the virtual device management layer is further configured to store the data by using the regeneration erasure coding to split the one or more equally sized objects into one or more subpackets, and splitting the one or more parity objects into one or more parity subpackets.

15. A non-transitory computer readable medium having computer code that, when executed on a processor, implements a method of storing data in a key-value reliability system comprising one or more storage devices that are grouped into a reliability group as a single logical unit and that are managed by a virtual device management layer, the method comprising:
determining the data meets a threshold corresponding to a reliability mechanism for storing the data, the reliability mechanism comprising object replication;
using the reliability mechanism indicated by a reliability mechanism identifier that is contained in metadata and that identifies the reliability mechanism; and
storing the data according to the reliability mechanism by:
selecting a KV value;
calculating a hash for hashing a key corresponding to the KV value;
determining a subset of storage devices of the one or more storage devices for storing a replica of a key object corresponding to the KV value; and
writing an updated value corresponding to the KV value to the subset of storage devices under a same user keyname.

16. The non-transitory computer readable medium of claim 15, wherein the reliability mechanism comprises packing, and wherein storing the data comprises:
- selecting one or more key objects stored in a same number of first respective one or more storage devices of the one or more storage devices of the reliability group;
- retrieving one or more value objects corresponding to the one or more key objects;
- padding a virtual zero on an end of one of the one or more value objects that does not have a largest value size of the one or more value objects to make a virtual value size of the one or more value objects equal;
- creating one or more parity objects from the one or more key objects;
- writing the one or more key objects to the first respective one or more storage devices; and
- writing the one or more parity objects to a same number of second respective one or more storage devices of the one or more storage devices, the one or more storage devices being distinct from the first respective one or more storage devices,
- wherein a number of the one or more key objects plus a number of the one or more parity objects is equal to a number of the one or more storage devices.

17. The non-transitory computer readable medium of claim 15, wherein the reliability mechanism comprises splitting, and wherein storing the data comprises:
- splitting the KV value into one or more equally sized objects;
- creating one or more parity objects from the one or more equally sized objects;
- determining a primary device of the one or more storage devices in which to place the KV value based on the hash; and
- writing one or more value objects in a same number of first respective one or more storage devices of the one or more storage devices, and writing one or more parity objects in a same number of second respective one or more storage devices of the one or more storage devices, in consecutive order and starting with the primary device, the second respective one or more storage devices being distinct from the first respective one or more storage devices,
- wherein a number of the one or more value objects plus a number of the one or more parity objects is equal to a number of the one or more storage devices.

* * * * *